United States Patent [19]

Lawther et al.

[11] Patent Number: 5,713,055
[45] Date of Patent: Jan. 27, 1998

[54] AMBIENT LIGHT SENSITIVE AUTOMATIC FLASH CONTROL CIRCUIT

[75] Inventors: Joel S. Lawther; Norbert Koenig, both of Rochester; David R. Dowe, Holley; Douglas W. Constable, Rochester, all of N.Y.

[73] Assignee: Eastman Kodak Company, Rochester, N.Y.

[21] Appl. No.: 756,315

[22] Filed: Nov. 25, 1996

[51] Int. Cl.⁶ .................................................. G03B 15/03
[52] U.S. Cl. ........................................ 396/165; 396/206
[58] Field of Search ............................... 396/165, 205, 396/206, 159

[56] References Cited

U.S. PATENT DOCUMENTS

| | | | |
|---|---|---|---|
| 3,849,786 | 11/1974 | Nanba et al. | 396/165 |
| 4,208,617 | 6/1980 | Schneider | 396/165 |
| 4,625,151 | 11/1986 | Kataoka | 396/165 |
| 5,233,384 | 8/1993 | Katoh et al. | 396/165 |

FOREIGN PATENT DOCUMENTS 7-218993  8/1995  Japan.

*Primary Examiner*—Howard B. Blankenship
*Assistant Examiner*—Nicholas J. Tuccillo
*Attorney, Agent, or Firm*—Francis H. Boos, Jr.

[57] ABSTRACT

A flash control circuit for a camera flash circuit in which a scene ambient light sensing circuit is coupled to the main flash capacitor which serves as the sole energy source for the light sensing circuit independent of the battery source. The ambient light sensing circuit comprises a light sensing device and resistor coupled in series across a zener diode which serves as a fixed voltage reference device for the light sensing circuit. In a preferred embodiment, the ambient light sensing circuit is coupled in series with the flash sync switch across the flash capacitor such that activation of the light sensing circuit occurs only while the sync switch is closed.

11 Claims, 1 Drawing Sheet

AMBIENT LIGHT SENSITIVE AUTOMATIC FLASH CONTROL CIRCUIT

FIELD OF THE INVENTION

The invention relates generally to camera flash circuits, and in particular to automatic flash control circuits operative to control activation of flash operation in response to sensed scene ambient light levels.

BACKGROUND OF THE INVENTION

Camera flash control circuits are known in which a scene ambient light sensor is employed to automatically control the activation of a flash illumination device such that flash is disabled in high ambient light conditions and enabled in low ambient light conditions. Such circuits are to be distinguished from flash quench circuits in which, when flash is activated, a light sensor responds to light reflected from the subject to turn off ("quench") the flash illumination device when an appropriate level of flash illumination is achieved for the determined film exposure condition.

An example of a flash control circuit for controlling flash in response to sensed scene ambient light conditions is shown in Japanese patent Kokai publication JP 7-218993; published Aug. 8, 1995. In this disclosure, an ambient light sensing circuit utilizes a CdS cell (light sensitive resistor) that is energized from the camera battery by means of a switch that is closed at the same time another switch is closed to initiate operation of a flash charging circuit. While the flash charging circuit is operating to charge the flash capacitor, the light sensing circuit responds to scene ambient light to vary a bias voltage on a transistor coupled across the flash trigger circuit capacitor. In high ambient light conditions, the CdS cell biases the transistor ON to shunt (discharge) the trigger capacitor thereby preventing triggering of the flash tube when a picture is taken. In low ambient light conditions, the CdS cell biases the transistor OFF thereby allowing charging of the trigger capacitor to enable activation of the flash tube when a picture is taken. This circuit has the disadvantage that the CdS cell circuit is energized directly from the camera battery as long as the charging circuit is in operation and thus is a constant, competing drain on the battery. This is a particular disadvantage in single-use, recyclable cameras in which the battery is not readily accessible to the camera user for replacement. Additionally, a battery voltage reduction during charging of the flash capacitor adversely affects the ability of the shunt transistor to conduct during high scene ambient light conditions. There is therefore a need for a low cost flash control circuit which avoids unnecessary drain on battery voltage while performing its scene ambient light level sensing function to control flash operation.

SUMMARY OF THE INVENTION

To address this need, there is provided a camera flash control circuit for a flash circuit having a flash capacitor and a flash illumination device wherein the flash control circuit comprises an ambient light sensing circuit for controlling operation of the flash circuit in response to sensed scene ambient light levels. In accordance with the invention, the light sensing circuit is coupled to the flash capacitor rather than the battery so as to be energized solely from the flash capacitor. In a preferred embodiment, the ambient light sensing circuit is coupled in series with the camera flash sync switch thereby energizing the light sensing circuit only when the sync switch is closed.

In another aspect of the invention, a camera flash circuit is provided that includes a flash capacitor, a flash illumination device, a flash sync switch and a flash trigger circuit. In accordance with this aspect of the invention, the camera flash circuit comprises a scene ambient light level sensing circuit for establishing a first voltage level in response to a low ambient scene light level requiring flash operation and a second voltage level in response to a high ambient scene light level not requiring flash operation. The scene ambient light level sensing circuit and the sync switch are coupled in series across the flash capacitor such that closure of the sync switch applies energy from the flash capacitor to the sensing circuit for generation of the first or second voltage levels. The trigger circuit includes a gate device that is coupled to the ambient light level sensing circuit and that is operative when the sync switch is closed to respond to the voltage level generated in the ambient light level sensing circuit to enable or inhibit triggering of the flash illumination device depending on the voltage level generated at the ambient light level sensing circuit. The ambient light level sensing circuit preferably includes a light sensing device and series connected load impedance coupled in parallel with a fixed voltage reference device between the sync switch and the flash capacitor, such that the voltage reference device is responsive to charge voltage on the flash capacitor to provide a fixed voltage reference across the light sensing device and series load impedance serving as the sole energy source for the ambient light level sensing circuit.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
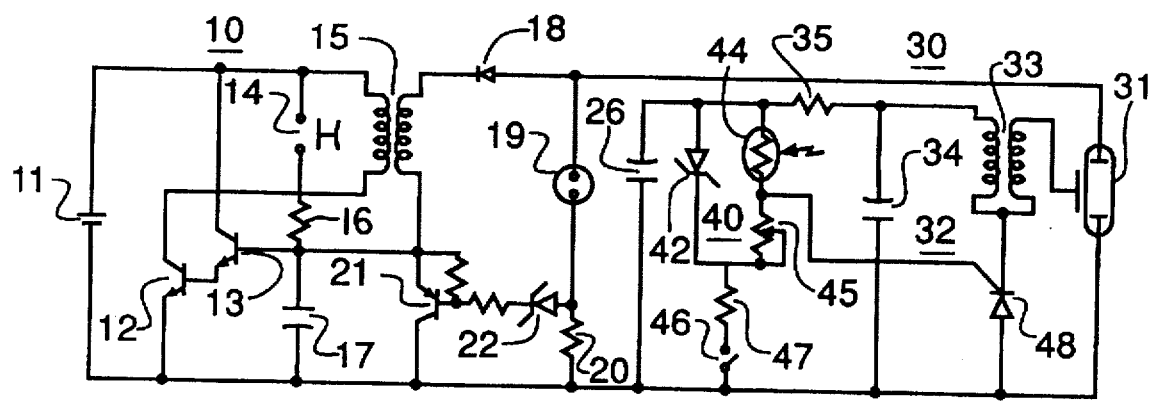
FIG. 1 is a schematic circuit diagram showing a camera flash circuit including one preferred embodiment of a flash control circuit of the present invention.

Referring to FIG. 1, a camera flash circuit is shown which comprises a charging circuit 10 and a flash actuation circuit 30 which includes a flash control circuit 40 according to the invention. The charging circuit 10, which is found in single-use cameras currently being sold by Eastman Kodak Company, includes a 1.5 volt battery source 11, oscillation transistors 12 and 13, a normally open, momentary contact start switch 14, an oscillation transformer 15, and a rectifier diode 18 coupled to main flash capacitor 26. When switch 14 is depressed, current through resistor 16 causes transistors 12 and 13 to conduct which initiates oscillations in transformer 15. When switch 14 is released, conduction of transistors 12 and 13 is maintained by pulses fed back from the secondary of transformer 15. The oscillation pulses in the secondary of transformer 15 are rectified by diode 18 and charge main flash capacitor 26 to a voltage of approximately −300 volts. Neon light 19 and resistor 20 comprise a flash ready indicator circuit in which neon light 19 illuminates when the voltage across flash capacitor 26 reaches a level sufficient to operate flash tube 31. A feedback circuit including zener diode 22 and transistor 21 is coupled from the flash indicator circuit to the base of oscillation transistor 13 and responds to the voltage across zener 22 when flash capacitor 26 reaches its fully charged state to turn off the oscillation in the charging circuit 10.

Flash circuit 30 includes flash capacitor 26, flash illumination device (flash tube) 31 and trigger circuit 32 comprising trigger transformer 33 and trigger capacitor 34. Trigger capacitor 34 is coupled to main flash capacitor 26 via resistor 35 to allow charging of capacitor 34 along with the charging of flash capacitor 26. A thyristor (SCR) 48 is coupled in series with the primary winding of trigger transformer 33 and trigger capacitor 34 and serves as gating means for enabling or inhibiting operation of the trigger circuit in the initiation of conduction in flash tube 31 depending on the voltage level applied to the gate of SCR 48. SCR 48 is driven into conduction when the DC gate voltage on SCR 48, referenced to the DC voltage on the SCR cathode which is connected to the primary winding of trigger transformer 33, exceeds the SCR gate-cathode diode drop. This causes trigger capacitor 34 to discharge through the primary of transformer 33. A stepped up voltage pulse generated in the secondary of transformer 33 is applied to the trigger electrode of flash tube 31, ionizing the gas in the tube and starting current conduction. Once tube 31 is rendered conductive, flash capacitor 26 discharges through the flash tube 31 until the discharge current falls below the level necessary to maintain ionization in the flash tube, at which time the flash terminates. Flash capacitor 26 remains discharged until recharged by charger circuit 10.

In accordance with the invention, flash circuit 30 includes a scene ambient light level sensing circuit 40 for controlling operation of the flash circuit in response to sensed scene ambient light levels. Ambient light level sensing circuit 40 comprises a light sensing device (CdS cell) 44, and a series connected variable resistor 45 which are coupled in parallel with a passive voltage reference device, zener diode 42, between a flash sync switch 46 and the negative charge voltage terminal of flash capacitor 26. The common terminal between CdS cell 44 and resistor 45 is coupled to the gate of SCR 48. Flash sync switch 46 is coupled, in known manner, to a camera shutter button (not shown) to synchronize the actuation of the flash operation with opening of the camera shutter.

In operation, it will be assumed that flash capacitor 26 has been charged to a voltage potential of −300 volts. When sync switch 46 is closed, zener diode 42 and resistor 47 are connected across flash capacitor 26 and establish a fixed voltage reference of 5 volts across CdS cell 44 and resistor 45. If the scene ambient light level sensed by CdS cell 44 is sufficiently low as to require flash operation, the resistance of CdS cell 44 will be high compared to that of resistor 45. This causes most of the 5 volt drop to appear across the CdS cell thereby applying a voltage of approximately −295 volts on the gate of SCR 48 at the instant that sync switch 46 is closed. This gate bias, close to 5 volts, is greater than the gate-cathode diode drop and therefore fires SCR 48 which discharges trigger capacitor 34 into the primary of trigger transformer 33 thereby firing flash tube 31. On the other hand, if the scene ambient light level is relatively high so as to obviate the need for flash, the resistance of CdS cell 44 becomes relatively low compared to the value of resistor 45. This results in an SCR gate voltage close to −300 volts. With less than a diode drop of voltage on the SCR gate, the SCR will not fire when the sync switch is closed thereby inhibiting operation of the flash tube 31.

It should be noted that with the flash control circuit of FIG. 1, the ambient light sensing circuit is energized solely from the charge voltage on main flash capacitor 26 and thus the light sensing circuit does not cause any unnecessary drain on the battery source 11. Also, a switch in series with the battery to turn on power to the light sensing circuit is not required. Moreover, the employment of a passive fixed voltage reference device, zener diode 42, to provide the operating voltage for the light sensing circuit provides accurate and reliable voltage biases on the SCR gate that are independent of the condition of the battery source. A variable resistor 45 is shown in the circuit as a means of providing calibration of the circuit to achieve the desired voltage biases on the SCR gate corresponding to scene light level thresholds that differentiate between when flash operation is or is not required. It will be appreciated that through appropriate design selection, a fixed value resistor might be employed in lieu of the variable resistor.

Figure 2:
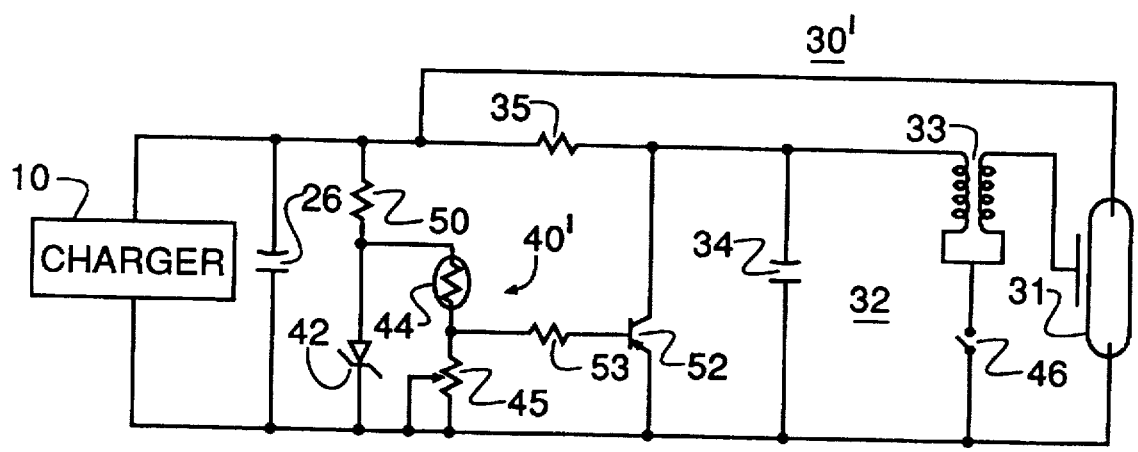
FIG. 2 is a schematic circuit diagram illustrating an alternative preferred embodiment of a flash control circuit in accordance with the invention.
Figure 1:
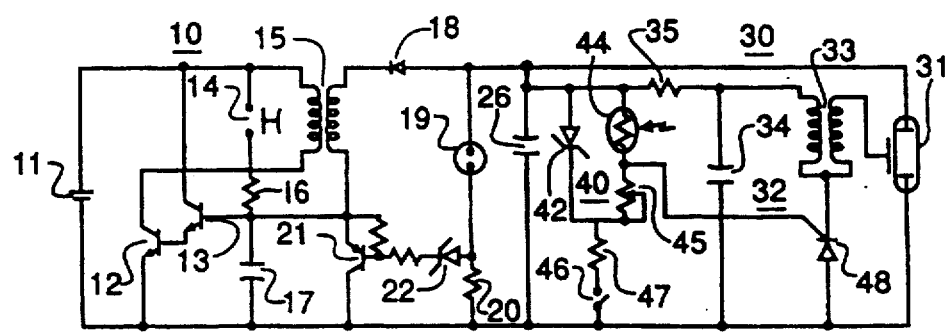

Referring now to FIG. 2, an alternative preferred embodiment of the invention is shown in which like components from the circuit of FIG. 1 are shown with the same reference numerals. In the circuit of FIG. 2, the sync switch 46 is coupled in conventional position in series between the primary winding of trigger transformer 33 and trigger capacitor 34 in lieu of SCR 48 of FIG. 1. In the ambient light sensing circuit 40', the parallel combination of zener diode 42 with CdS cell 44 and variable resistor 45 is coupled via resistor 50 across flash capacitor 26. The common connection of CdS cell 44 and resistor 45 is coupled via resistor 53 to the base of transistor 52 which has its collector and emitter coupled across trigger capacitor 34. In this circuit, the variable bias voltage from the light sensing circuit is used to drive the base of transistor 52. If the scene ambient light level is high, the CdS cell resistance is low producing a nearly 5 volts bias on the base transistor 52 thereby turning the transistor ON. This causes the collector of transistor 52 to conduct which prevents the charging of trigger capacitor 34 and thereby prevents operation of the flash tube when sync switch 46 is closed at the taking of a picture. When the ambient light is low, the CdS resistance is high and transistor 52 is biased OFF by the low (nearly ground) voltage level at the bottom of CdS cell 44. This allows the charging of trigger capacitor 34 and the normal operation of flash tube 31 when sync switch 46 is closed. It may be noted that the use of a shunt transistor across the trigger capacitor is similar to the circuit disclosed in aforementioned Japanese publication 7-218993. However, unlike that circuit, the ambient light level sensing circuit of FIG. 2 is not coupled to the battery source but instead is coupled to the flash capacitor. The light sensing circuit thus derives its operating energy solely from the flash charge voltage. In a low cost single use camera, it is not atypical for the battery voltage to be as low as 0.8 volts when the charger circuit is operating. This would be insufficient to power the shunt transistor 52. In contrast to this, energizing the ambient light sensing circuit from the flash capacitor and utilizing the fixed voltage drop zener diode assures reliable operation of the flash control circuit even if the battery voltage is too low for the light sensing circuit to properly operate the shunt transistor.

The invention has been described with reference to a preferred embodiment. However, it will be appreciated that variations and modifications can be effected by a person of ordinary skill in the art without departing from the scope of the invention.

PARTS LIST 10 flash capacitor charging circuit
11 battery source 1.5 v
12,13 oscillation transistors
14 momentary start switch 15 oscillation transformer
16 resistor (150K)
17 capacitor (470 pf)
18 diode
19 neon indicator light
20 resistor (3.9 Meg)
21 oscillation turn-off transistor
22 feedback zener diode (100 v)
26 main flash capacitor (160 µf)
30,30' flash circuit
35 resistor (1 Meg)
32 flash trigger circuit
33 trigger transformer
34 trigger capacitor (0.022 pf)
40,40' scene ambient light level sensing circuit
42 zener diode (5 v)
44 CdS light sensitive resistor
45 variable resistor (10K)
46 flash sync switch
47,50 resistor (1 Meg)
48 thyristor (SCR)
52 shunt transistor
53 resistor

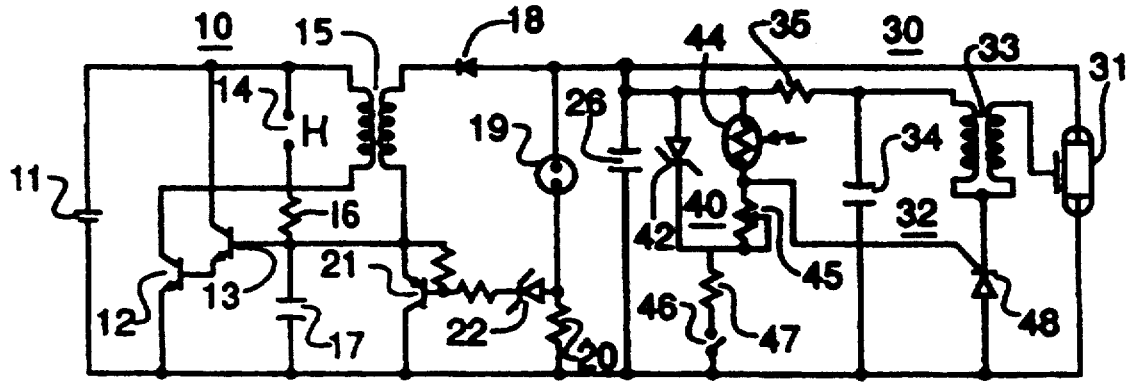

What is claimed is:

1. A camera flash control circuit for a flash circuit having a flash capacitor and a flash illumination device, the flash control circuit comprising an ambient light sensing circuit for controlling operation of the flash circuit to suppress initiation of flash illumination in response to sensed high scene ambient light levels for which flash illumination is unnecessary, the light sensing circuit being coupled to said flash capacitor and being energized solely from said flash capacitor.

2. The camera flash control circuit of claim 1, further including a flash sync switch coupled in the circuit with the ambient light sensing circuit such that said light sensing circuit is energized only when said sync switch is closed.

3. The flash control circuit of claim 2 wherein said ambient light sensing circuit and said sync switch are coupled in series across said flash capacitor.

4. The flash control circuit of claim 2 wherein said ambient light sensing circuit includes a light sensing device and a series load impedance coupled in parallel with a passive, fixed voltage reference device between said sync switch and said flash capacitor, said voltage reference device being responsive to charge voltage on said flash capacitor only when said sync switch is closed for setting a fixed voltage drop across said light sensing device and series load impedance.

5. The flash control circuit claim 4 wherein said voltage reference device is a zener diode.

6. A flash circuit including a flash capacitor, a flash illumination device, a flash sync switch and a flash trigger circuit, the flash circuit comprising:

a scene ambient light level sensing circuit for establishing a first voltage level in response to a low ambient scene light level requiring flash operation and a second voltage level in response to a high ambient scene light level not requiring flash operation, said scene ambient light level sensing circuit and said sync switch being coupled in series across said flash capacitor such that closure of said sync switch applies energy from said flash capacitor to said sensing circuit for generation of said first or second voltage levels.

7. The flash circuit of claim 6, said flash trigger circuit including a trigger capacitor and said sync switch being coupled to said trigger circuit, wherein said ambient light level sensing circuit includes a light level sensing device and series connected load impedance coupled in parallel with a voltage reference device directly across said flash capacitor, said voltage drop device being responsive to charge voltage on said flash capacitor for setting a fixed voltage reference across said light sensing device and series load impedance, said flash circuit further including switching means coupled across said trigger capacitor and being responsive to second voltage level from said ambient light level sensing circuit for shunting said trigger capacitor thereby preventing triggering of said flash illumination device when a high scene ambient light level is sensed.

8. The flash circuit of claim 7 wherein said switching means comprises a transistor having its base coupled to said ambient light level sensing circuit and its collector and emitter coupled across said flash trigger capacitor.

9. The flash circuit of claim 6, further including gating means coupling said ambient light level sensing circuit to said trigger circuit, said gating means being operative when said sync switch is closed for enabling said trigger circuit to energize said flash illumination device in response to said first voltage level and for preventing said trigger circuit from energizing said flash illumination device in response to said second voltage level.

10. The flash circuit of claim 9 wherein said ambient light level sensing circuit includes a light level sensing device and series connected load impedance coupled in parallel with a fixed voltage reference device between said sync switch and said flash capacitor, said fixed voltage reference device being responsive to charge voltage on said flash capacitor when said sync switch is closed for setting a fixed voltage drop across said light sensing device and series load impedance.

11. The flash circuit of claim 10 wherein said voltage reference device is a zener diode.

* * * * *

UNITED STATES PATENT AND TRADEMARK OFFICE
CERTIFICATE OF CORRECTION

PATENT NO.    : 5,713,055
DATED         : January 27, 1998
INVENTOR(S)   : Joel S. Lawther et al.

It is certified that error appears in the above-indentified patent and that said Letters Patent is hereby corrected as shown below:

The title page, showing the illustrative figure, should be deleted, and substitute therefor the attached title page, showing the connection between capacitor 26 and diode 18 in the illustrative figure; and Delete Fig. 1, and substitute therefor the attached Fig. 1, showing connection between capacitor 26 and diode 18.

Signed and Sealed this

Seventh Day of July, 1998

Attest:

BRUCE LEHMAN

*Attesting Officer*            *Commissioner of Patents and Trademarks*

United States Patent [19]

Lawther et al.

[11] Patent Number: 5,713,055

[45] Date of Patent: Jan. 27, 1998

[54] AMBIENT LIGHT SENSITIVE AUTOMATIC FLASH CONTROL CIRCUIT

[75] Inventors: Joel S. Lawther; Norbert Koenig, both of Rochester; David R. Dowe, Holley; Douglas W. Constable, Rochester, all of N.Y.

[73] Assignee: Eastman Kodak Company, Rochester, N.Y.

[21] Appl. No.: 756,315

[22] Filed: Nov. 25, 1996

[51] Int. Cl.⁶ .................................. G03B 15/03
[52] U.S. Cl. ........................... 396/165; 396/206
[58] Field of Search ......................... 396/165, 205, 396/206, 159

[56] References Cited

U.S. PATENT DOCUMENTS

| | | | |
|---|---|---|---|
| 3,849,786 | 11/1974 | Namba et al. | 396/165 |
| 4,208,617 | 6/1980 | Schneider | 396/165 |
| 4,625,151 | 11/1986 | Kataoka | 396/165 |
| 5,233,384 | 8/1993 | Katoh et al. | 396/165 |

FOREIGN PATENT DOCUMENTS 7-218993  8/1995  Japan

Primary Examiner—Howard B. Blankenship
Assistant Examiner—Nicholas J. Tuccillo
Attorney, Agent, or Firm—Francis H. Boos, Jr.

[57] ABSTRACT

A flash control circuit for a camera flash circuit in which a scene ambient light sensing circuit is coupled to the main flash capacitor which serves as the sole energy source for the light sensing circuit independent of the battery source. The ambient light sensing circuit comprises a light sensing device and resistor coupled in series across a zener diode which serves as a fixed voltage reference device for the light sensing circuit. In a preferred embodiment, the ambient light sensing circuit is coupled in series with the flash sync switch across the flash capacitor such that activation of the light sensing circuit occurs only while the sync switch is closed.

11 Claims, 1 Drawing Sheet